UNITED STATES PATENT OFFICE.

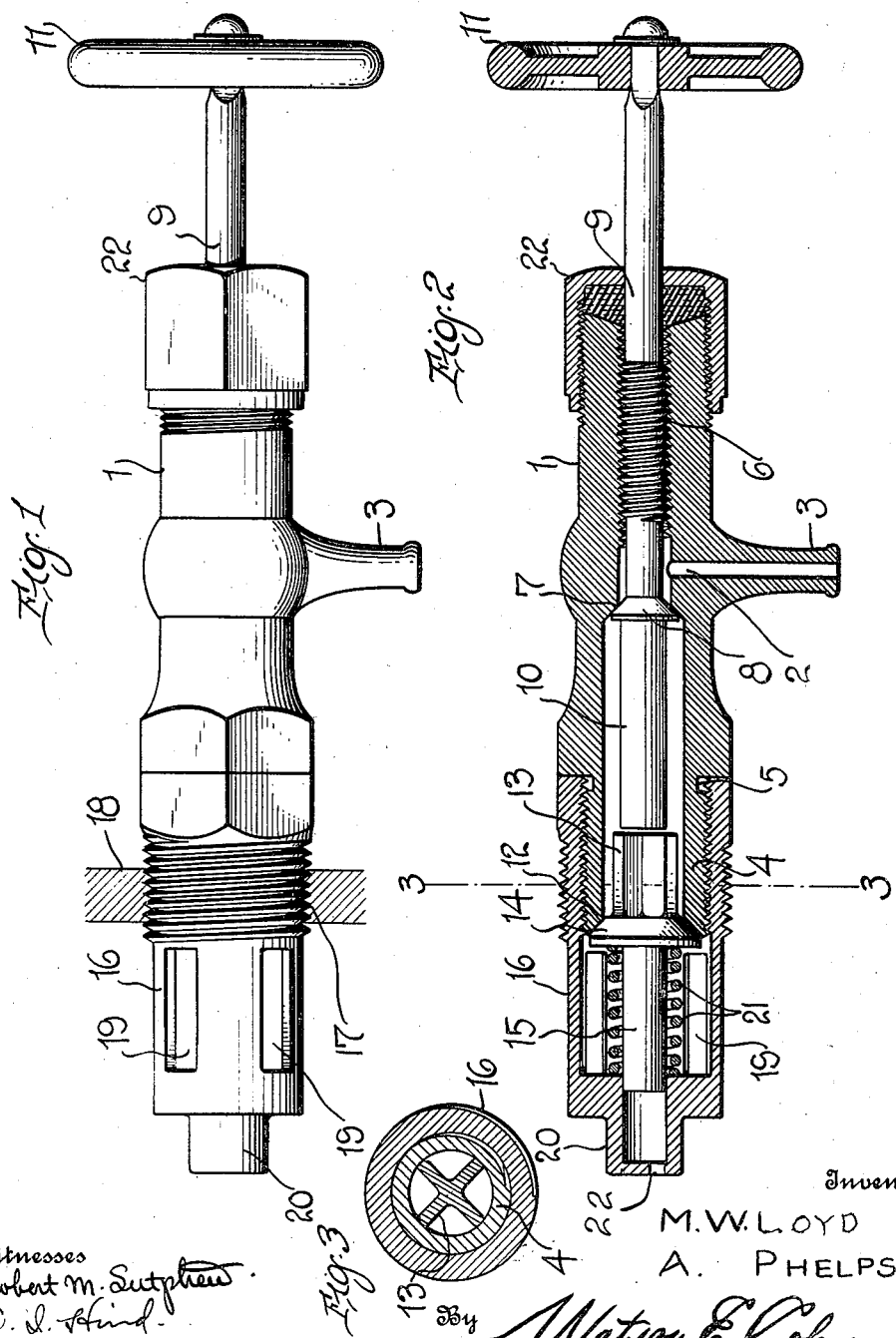

MELVIN W. LOYD, OF AFTON, OKLAHOMA, AND ABRAHAM PHELPS, OF FORT SCOTT, KANSAS.

SAFETY-VALVE.

1,136,606. Specification of Letters Patent. Patented Apr. 20, 1915.

Application filed May 29, 1914. Serial No. 841,880.

*To all whom it may concern:*

Be it known that we, MELVIN W. LOYD, citizen of the United States, residing at Afton, in the county of Ottawa and State of Oklahoma, and ABRAHAM PHELPS, citizen of the United States, residing at Fort Scott, in the county of Bourbon and State of Kansas, have invented certain new and useful Improvements in Safety-Valves, of which the following is a specification, reference being had to the accompanying drawings.

This invention relates to new and useful improvements in safety valves for locomotive boilers or the like, and an object of this invention is the provision of a valve in which two reciprocating valve members are mounted, the valve members being reciprocated by a common operating means, one of the valve members being spring pressed and disposed within a cage detachably connected to the inner end of the valve body, the spring pressed valve being adapted to engage against a seat formed on the inner extremity of the valve body.

A further object of this invention is the provision of a valve of this character which includes two valve members, one of the valve members being spring operated and mounted in a cage connected to the inner end of the valve body and disposed within the boiler, the other valve member being mounted in the body of the valve in alinement with the valve member in the cage to operate the same, the valve body being weakened at its juncture with the cage so that should the body be struck by a foreign object, the same will be broken at its weakened portion, whereby the spring and the pressure of steam against the valve maintained within the cage and operable against the inner extremity of the body, will move the valve forwardly to close the bore of the body to prevent the escape of steam or water from the boiler.

With these and other objects in view, our invention consists in the novel construction, combination, and arrangement of parts to be hereinafter more fully described, claimed, and illustrated in the accompanying drawing, in which, Figure 1 is an elevational view of our improved safety valve mounted in a boiler; Fig. 2 is a longitudinal section thereof; and Fig. 3 is a sectional view on the line 3—3 of Fig. 2.

Referring more particularly to the drawing, the numeral 1 designates the tubular body of the valve which is provided intermediate its length with an opening 2 which leads through a discharge nozzle 3. The body is provided at its inner end with a reduced exteriorly threaded portion 4, the body being weakened as at 5, at the juncture of the reduced portion 4 with the main portion of the body. The bore of the body is reduced and threaded as at 6, from a point inwardly of the opening 2 in the body and the outer extremity of the body, the inner extremity of the wall of the reduced portion of the bore forming a seat 7 for a valve member 8 which is provided with oppositely projecting stems 9 and 10. The forwardly projecting stem 9 is provided with a left handed thread for a portion of its length adjacent the valve member 8, for engagement with the threads of the reduced portion 6 of the bore, the forward end of the forwardly extending stem 9 projecting outwardly of the body and being angular at its extremity for engagement with an operating handle 11. When the valve member 8 is engaged against its seat 7 in the body of the valve, the inner extremity of the inwardly extending stem 10 is disposed closely adjacent the inner extremity of the reduced portion 4 of the body and the inner extremity of the reduced portion 4 is beveled to form a valve seat 12.

The forwardly extending guide 13 of a valve member 14 is disposed within the inner end of the reduced extension 4 to engage the inner extremity of the inwardly extending stem 10 of the valve member 8, the valve 14 having an inwardly extending stem 15 which projects within a cage 16 which is threadably mounted on the reduced portion 4 of the body to house the valve 14. The cage 16 is threaded for a portion of its length adjacent its outer end so that the same may be threadably mounted in an opening 17 in the boiler 18, and the cage is provided with a plurality of openings or ports 19 through which the air or steam within the boiler may pass into the body of the valve when the valve members are in open position. The inner extremity of the cage is provided with a reduced tubular extension 20 to receive and guide the inner extremity of the stem 15, and engaged around the stem is a helical spring 21, one end of which bears against the valve member 14 and the other end of which bears against the outer end of the cage 16, the spring normally forcing the valve into engagement with its seat 12. The forward end of the body is exteriorly threaded for engagement with a packing nut 22, the packing nut preventing leakage of steam or water from the forward end of the valve body.

In the practical use of our device, our improved valve is mounted within an opening in the locomotive boiler by threadably engaging the threaded portion of the cage within the opening so that the ports 19 are disposed within the boiler. The forwardly extending stem 9 of the valve member 8 is mounted within the bore of the body 1 upon the inner end thereof, the threads on the stem 9 engaging the threads on the reduced portion 6 of the bore so that the forward extremity of the stem projects beyond the forward end of the body for engagement with the handle 11 and the valve member 8 engages its seat 7. The valve member 14 is then engaged with the valve seat 12 formed on the inner end of the reduced portion 4 of the body, with the guide 13 engaging the inner end of the inwardly extending stem 10 of the valve member 8, and the helical spring 21 is disposed around the rearwardly extending stem 15 of the valve member 14, whereupon the reduced portion 4 is engaged with the interior threads of the cage so that the forward extremity of the cage engages the rear end of the body portion of the valve and, in this position, the inner extremity of the valve stem 15 is engaged in the tubular guide extension 20 of the cage. When it is desired to reduce the pressure of the steam or water contained within the boiler, the operating handle is rotated to move the valve member 8 from its seat 7, and the inwardly extending valve stem 10 simultaneously moves the valve member 14 from its seat 12, whereby the steam or water is allowed to pass through the body of the valve and out of the outlet pipe 3 and, upon rotating the handle 11 in the reverse direction, the valve member 8 is moved to its closed position against its seat 7, and the valve member 14 is automatically forced against its seat by the action of the spring 21 and the pressure of the steam. As the body of the valve projects outwardly from the steam dome (not shown), of the locomotive boiler, the valve is in a position to be struck by a foreign object and, by providing the weakened portion 5 at the juncture of the body of the valve with the reduced portion 4 thereof, the outside body will be broken off at the weakened portion and, by the provision of the spring pressed valve member 14 which engages the valve seat 12 with the inner end of the reduced portion 4, steam or water will be prevented from escaping from the boiler should the valve body become broken.

It will be understood that the spring 21 is primarily adapted to hold the valve member 14 in its seated position when the boiler is cold and that, if desired, the use of the spring may be dispensed with, as the pressure of the steam against the valve will be sufficient to close the same should the valve be broken off at its weakened portion.

The end wall of the tubular extension 20 of the cage is provided with an opening 22 through which mud or other sediment which may accumulate between the end of the valve stem and the end wall of the extension, may pass into the body of the boiler so that the lodging of any sediment within this extension will not prevent free working of the valve member 14.

It will be understood that various valve bodies, other than shown in the accompanying drawing, may be threaded within the outer end of the cage 16, it being appreciated that any alternative form of body so used in connection with our device, will be weakened at the juncture of the main portion of the body with the reduced extension thereof, so that upon engagement of the body with foreign objects, the body will preferably be broken off at the weakened portion.

Having thus fully described our invention, what we desire to claim and secure by Letters Patent, is:—

A safety valve comprising a hollow body, the bore of said body being reduced at its forward end to form a rearwardly facing valve seat, a discharge vent formed in the body forwardly of the valve seat, a valve member mounted for reciprocation in the bore rearwardly of the seat, a forwardly projecting operating stem carried by the valve member, said body having a reduced rearwardly projecting exteriorly threaded portion, the inner extremity of the reduced portion being beveled to provide a valve seat, the reduced portion at its juncture with the body being weakened, a cage having an open forward end and being provided with interior threads at its forward end for engagement with the exterior threads of the reduced portion of the body, said cage being exteriorly threaded at its forward end whereby the cage and body may be connected in a suitable support, a spring pressed valve carried by the cage for engagement against the valve seat on the extremity of the reduced portion of the body, the last mentioned valve having a forwardly extending guide member for engagement in the reduced portion of the body, and a rearwardly projecting stem carried by the first mentioned valve member for engagement against said guide member.

In testimony whereof we hereunto affix our signatures in the presence of two witnesses.

MELVIN W. LOYD.
ABE PHELPS.

Witnesses:
A. E. LEWIS,
C. W. SALMANS.